(12) United States Patent
Bullister et al.

(10) Patent No.: US 6,882,913 B2
(45) Date of Patent: Apr. 19, 2005

(54) ELECTRICAL CONTROL SYSTEM FOR AUTOMOTIVE VEHICLE HAVING ELECTRICALLY ASSISTED POWER STEERING

(75) Inventors: Kevin Michael Bullister, Ypsilanti, MI (US); Timothy Gerard Offerle, Whittaker, MI (US)

(73) Assignee: Ford Global Technologies, LLC, Dearborn, MN (US)

( * ) Notice: Subject to any disclaimer, the term of this patent is extended or adjusted under 35 U.S.C. 154(b) by 38 days.

(21) Appl. No.: 10/248,563

(22) Filed: Jan. 29, 2003

(65) Prior Publication Data

US 2004/0148075 A1 Jul. 29, 2004

(51) Int. Cl.$^7$ ............................................... B62D 5/06
(52) U.S. Cl. ........................... 701/41; 701/42; 180/422; 180/6.44; 318/438
(58) Field of Search ................... 701/41, 42; 388/806, 388/815; 180/422, 425, 426, 443, 6.44; 318/438

(56) References Cited

U.S. PATENT DOCUMENTS

| | | | |
|---|---|---|---|
| 4,350,219 A | | 9/1982 | Olbrich et al. ............. 180/65.1 |
| 4,471,280 A | | 9/1984 | Stack .......................... 318/586 |
| 4,639,651 A | | 1/1987 | Shimizu ..................... 318/432 |
| 4,800,974 A | | 1/1989 | Wand et al. ................ 180/446 |
| 5,668,721 A | | 9/1997 | Chandy ...................... 180/412 |
| 5,904,222 A | * | 5/1999 | Liubakka et al. ........... 180/422 |
| 6,092,012 A | * | 7/2000 | Shimizu ...................... 701/41 |
| 6,195,601 B1 | * | 2/2001 | Spillner et al. .............. 701/41 |
| 6,250,418 B1 | * | 6/2001 | Shimizu et al. ............. 180/422 |
| 6,556,778 B1 | * | 4/2003 | Zhang et al. ................ 388/806 |

* cited by examiner

Primary Examiner—Thomas G. Black
Assistant Examiner—Arthur D. Donnelly
(74) Attorney, Agent, or Firm—Gary Smith; Ford Global Technologies, LLC

(57) ABSTRACT

An electrical system for increasing the amount of voltage available to an electric power steering motor under high demand conditions includes a vehicle speed sensor that ascertains the speed of the vehicle, a steering wheel sensor that ascertains the rotational speed of the vehicle steering wheel, and a steering voltage controller that receives the signals provided by the vehicle speed sensor and the steering wheel sensor and processes these input signals to increase the voltage furnished to the power steering system by causing at least one component that consumes electrical power in the vehicle to reduce power consumption, or by causing a component that produces electrical power to increase power output, or by a combination of reducing power consumption and increasing power production. The present method increases the voltage available to an electric power system steering system by sensing vehicle speed and steering wheel rotational speed, by determining whether these conditions indicate a demand for greater power steering assist, and by managing electric load and power output to provide more voltage to the electric power steering motor when high demand for power assistance and torque is indicated.

11 Claims, 2 Drawing Sheets

ELECTRICAL CONTROL SYSTEM FOR AUTOMOTIVE VEHICLE HAVING ELECTRICALLY ASSISTED POWER STEERING

BACKGROUND OF INVENTION

1. Field of the Invention

The present invention relates to a system for controlling the voltage furnished to an electrically assisted power steering system in an automotive vehicle.

2. Disclosure Information

Automotive designers typically determine the size of electrically assisted power steering motors based on the maximum torque requirement and a given level of voltage (typically 13.5 volts in a 12 volt system). Such motors must be sized to provide sufficiently high torque at low speeds for parking conditions, as well as sufficient torque at higher speeds for sudden evasive maneuvers. Of course, optimal response time comes at the expense of increased motor size and weight.

The present inventors have determined that by increasing the voltage available to the motor on demand, thereby increasing the torque output of the motor, a smaller and lighter electric motor may be used in an electric power steering system, simply because greater torque is available without a larger motor.

U.S. Pat. No. 5,668,721 illustrates a system in which an electric power steering motor is controlled in two modes of operation, a voltage mode and a current mode, with each mode producing different operational characteristics. The system of the '721 patent and other known systems powering the steering motor utilize only the voltage level being maintained by the vehicle's electrical system to drive the motor. In contrast, a system according to the present invention increases the voltage available to a steering motor in high-assist situations by shedding electric loads imposed by power consuming components and, where appropriate, by increasing power output from the power source whenever high-assist steering situations are present.

SUMMARY OF INVENTION

According to the present invention, a system and method for controlling the voltage provided to a power steering motor. Whenever vehicle speed and steering wheel rotational speed indicate that high-torque steering assist is required, a steering voltage controller causes greater voltage to be available to the electric power steering motor by causing other power consumption components in the automobile to reduce their power consumption (load shedding) or by causing power generating components to increase voltage output (voltage boosting).

By increasing the voltage available to the power steering motor in high demand situations, the present invention advantageously allows automotive designers to utilize smaller, lighter, and less expensive motors in their electric power steering systems.

Other advantages, as well as the features and objects of the present invention, will become apparent to the reader of this specification.

DETAILED DESCRIPTION

Figure 1:
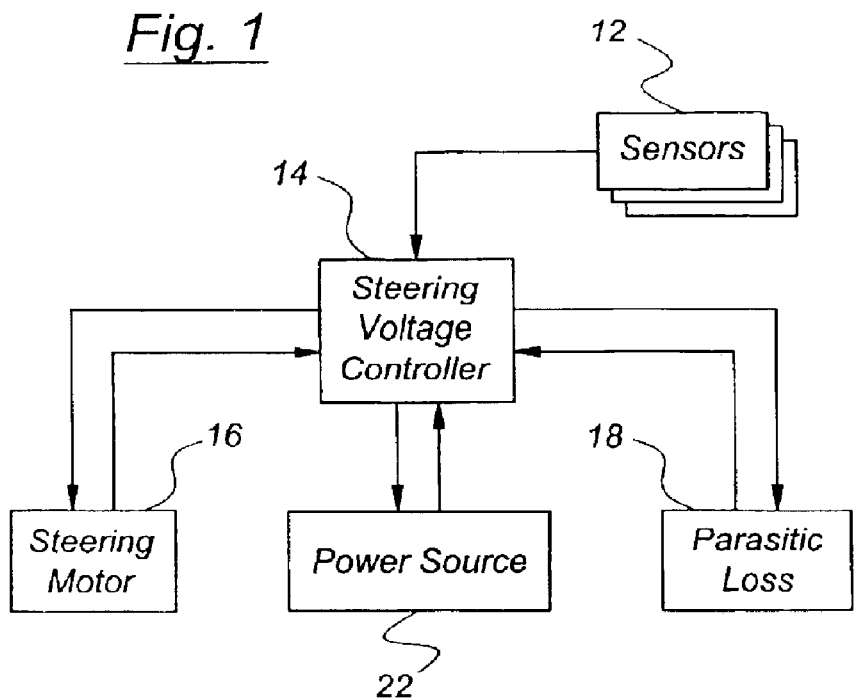
FIG. 1 is a schematic representation of the electrical system according the present invention.

As shown in FIG. 1, an electrical system according to the present invention comprises sensors 12 that produce input signals supplied to steering voltage controller 14. Steering voltage controller 14 processes the signals provided by sensors 12 and determines whether operating conditions require high-torque assist to power steering motor 16. If high-torque demand is indicated (as described below), steering voltage controller 14 sends signals to a parasitic loss, or in other words, an electric power consumption component 18, to reduce power consumption.

According to another aspect of the present invention, when sensors 12 indicate a high-torque situation, steering voltage controller 14 instructs the vehicle's power source 22, such as an alternator, to increase voltage levels. When high torque demand is indicated, load shedding, voltage boosting, or both load shedding and voltage boosting will result in more voltage being available to steering motor 16, resulting in more torque assist for the vehicle's steering gear mechanism.

The present invention contemplates using at least two sensors for the purpose of indicating high torque demand for the steering system: a vehicle speed sensor, and a steering wheel rotational speed sensor. When vehicle speed is low, such as in parking situations, demand for greater assist and torque will be high. At faster speeds, demand for greater assist and torque may be high when the vehicle is performing an evasive maneuver, which may be ascertained by, for example, sensing the rotational speed of the steering wheel. Those skilled in the art will appreciate in view of this disclosure that although vehicle speed and steering wheel sensors have been described, other sensors could also provide relevant input to steering voltage controller 14. Examples of other possible sensors include a torque sensor for sensing the amount of torque the operator applies to the steering wheel, a sensor for ambient temperature, a sensor for determining road conditions, a sensor for ascertaining the proximity of other vehicles or obstacles, and other sensors that indicate that a higher degree of steering assist is present or desired.

Steering voltage controller 14 receives and processes the information from sensors 12. To determine whether a demand for greater assist and higher torque is present, steering voltage controller 14 compares the data obtained from sensors 12 to values contained within a look-up table. Said look-up table contains threshold values for various conditions. For example, if the operator turns the vehicle's steering wheel when the vehicle's speed sensor indicates that the vehicle is stationary or traveling very slowly, the look-up table will indicate that these conditions signal a high demand for power assisted steering. Similarly, if the information received from some of sensors 12 indicates a higher rate of speed, but another sensor signals high rotational speed of the steering wheel (indicative of an evasive maneuver) the look-up table would indicate the presence of demand for greater assist and higher torque to the vehicle's steering system.

Those skilled in the art will appreciate in view of this disclosure that in lieu of a lookup table, steering voltage controller 14 could be programmed to use a formula or algorithm using the information supplied by sensors 12 to ascertain whether a demand for greater assist and higher torque is present or imminent.

When steering voltage controller 14 determines that a demand for greater assist and therefore, higher torque, is present, it generates an output signal so indicating. Said output signal is transmitted to one or more vehicle components 18 that consume electric power to cause said component(s) to reduce power consumption. This output signal to reduce power consumption, or load shedding, is depicted in FIG. 1 as a line from steering voltage controller 14 to parasitic loss 18. The present invention contemplates that the power consumption components constituting parasitic loss 18 will provide feedback to steering voltage controller 14 relating to timing, duration and quantity of power being consumed. This data feedback is depicted in FIG. 1 as a line drawn from parasitic loss 18 to steering voltage controller 14. Those skilled in the art will appreciate that the output signal from steering voltage controller 14 to parasitic loss 18 and the feedback from parasitic loss 18 to steering voltage controller 14 may be routed through other components, amplified, or otherwise modified or monitored for convenience, utility or enhanced performance. Such modification and monitoring might occur, for example, by routing the output signal from steering voltage controller 14 through one or more electronic control modules typically found in automotive vehicles.

According to another aspect of the present invention, when conditions indicate a need for greater steering assist and torque to the power steering system, steering voltage controller 14 transmits output signals indicating a need for greater power output to power source 22. Again, those skilled in the art will appreciate, as suggested in this disclosure, that it may be practical or desirable to route, amplify, modify, or monitor the output signal from steering voltage controller 14 to power source 22 through an electronic control module or other electronic devices for convenience, utility or enhanced performance.

When demand for greater assist and higher torque is present, steering voltage controller 14 sends a signal causing steering motor 16 to utilize the greater voltage available to it to produce more torque. The present invention contemplates that steering motor 16 will provide feedback to steering voltage controller 14 relating to timing, duration, and quantity of power consumed. Those skilled in the art will appreciate, as suggested in this disclosure, that it may be practical or desirable to route, amplify, modify, or monitor the output and feedback signals between steering voltage controller 14 and steering motor 16 using an electronic control module or other electronic devices for convenience, utility or enhanced performance.

Electric power steering systems typically include a "steering control module" that uses input signals from sensors, such as a vehicle speed sensor and a steering wheel torque sensor, to determine and furnish a level of voltage to the steering motor which is commensurate with the degree of steering assistance required. This function differs from the functions performed by steering voltage controller 14 heretofore described because, as noted above, steering voltage controller 14 uses input signals to increase the voltage available for utilization by steering motor 16 by load shedding and power boosting, whereas a typical steering control module regulates the amount of torque produced by steering motor 16 using a relatively constant voltage level maintained by the vehicle's electrical system. The inventors believe that the best means of implementing the present invention is to route the output signals from steering voltage controller 14 to a steering control module, which would modify or monitor said output signals together with a variety of other signals, in order to provide the proper voltage to steering motor 16. The functions performed by steering voltage controller 14 could obviously be advantageously combined or integrated with a steering control module.

Those skilled in the art will also appreciate in view of this disclosure that electric steering motor 16 could be directly coupled to the vehicle's steering system, or could be used to drive a closed-system hydraulic pump coupled to the vehicle's steering system.

Figure 2:
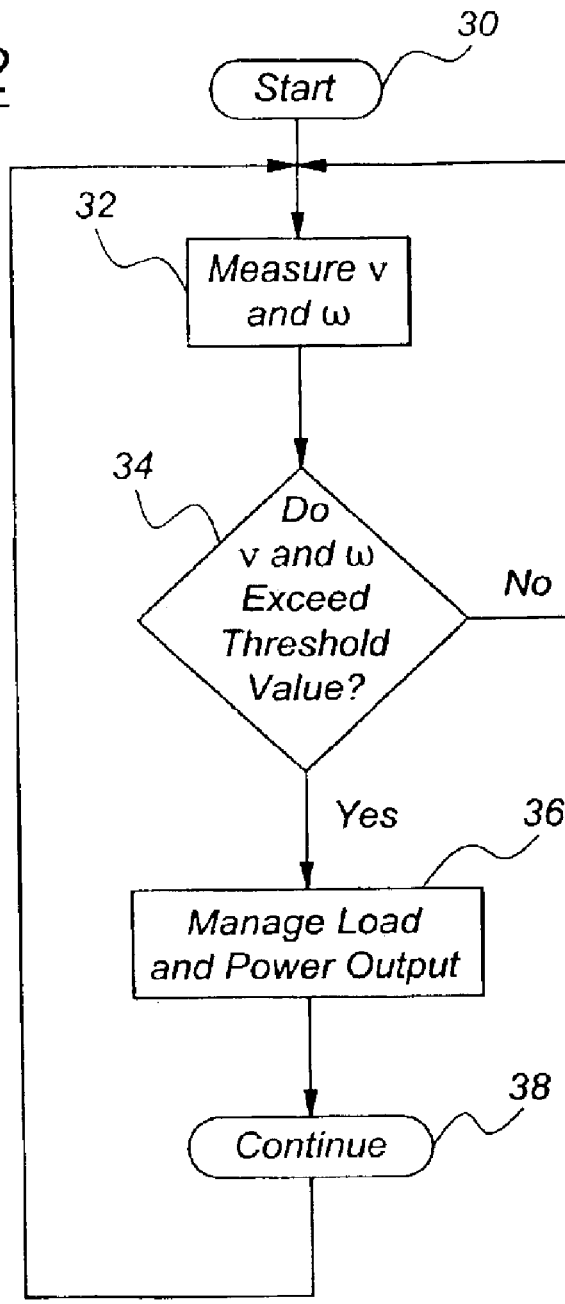
FIG. 2 is a flow diagram illustrating a method for increasing the voltage available to an electric power-assisted steering system according to the present invention.

FIG. 2 illustrates a method for increasing the voltage available to an electric power-assisted steering system according to the present invention. After starting at block 30, steering voltage controller 14 moves to block 32, where vehicle speed v and steering wheel angular velocity ω are measured. Then, at block 34 controller 14 determines whether v and ω, whether together, or individually, exceed threshold values. For purposes of this disclosure, "exceed threshold values" means any condition where vehicle speed v and steering wheel angular velocity ω have values that in combination indicate that greater steering assistance and torque are required due to vehicle speed v and steering wheel angular momentum ω. For example, in a typical parking situation, vehicle speed may be zero and steering wheel angular velocity may be positive. Under such conditions, v and ω are deemed to collectively exceed threshold values even though said individual values may be zero or very low. As shown in block 34 of FIG. 2, if v and ω do not exceed threshold values, the present method returns to block 32 and resumes measurement of v and ω. If, however, v and ω exceed threshold values, controller 14 moves to block 36, wherein the load drawn by power consumption components 18 and/or the output of the vehicle's power source 22 are managed in order to make a greater voltage available to power steering motor 16. Thereafter, the routine returns to block 32 and continues.

Those skilled in the art will appreciate in view of this disclosure that additional steps and detail could be introduced into FIG. 2 without substantially altering the method of the present invention. This is a matter of design choice commended to those wishing to employ a method according to the present invention.

What is claimed is:

1. An electrical system for an automotive vehicle having an electrically assisted power steering system, said electrical system comprising:

a vehicle speed sensor that ascertains the speed of the vehicle and provides a signal indicative thereof;

a steering wheel sensor that ascertains the rotational speed of the vehicle steering wheel and provides a signal indicative thereof;

at least one component of the vehicle, other than the electrically assisted power steering system, that consumes electrical power; and a steering voltage controller that receives the signals provided by the vehicle speed sensor and the steering wheel sensor, with said controller processing said input signals to produce output signals that control the voltage furnished to the power steering system and to said electric power consuming component.

2. An electrical system according to claim 1, wherein the steering voltage controller, in response to input signals indicating a high demand for power-assisted steering from the vehicle speed sensor and from the steering wheel sensor, produces an output signal that causes said electrical power consuming component to reduce power consumption.

3. An electrical system according to claim 2, wherein the steering voltage controller increases the voltage available to the power steering system when the signals from the vehicle speed sensor and the steering wheel sensor indicate a need for high demand steering assistance.

4. An electrical system according to claim 1, further comprising at least one component of the vehicle that produces electrical power, with said steering voltage controller controlling the operation of said electrical power production component.

5. An electrical system according to claim 4, wherein the steering voltage controller, in response to signals indicating a high demand for power-assisted steering from the vehicle speed sensor and from the steering wheel sensor, produces an output signal that instructs said electric power production component to increase power production.

6. An electrical system according to claim 5, wherein the steering voltage controller is programmed to furnish the increased power from said electric power production component to the steering system when said input signals from the vehicle speed sensor and the steering wheel sensor indicate a need for high demand steering assistance.

7. An apparatus for regulating voltage supplied to an electric motor assisted steering system in an automotive vehicle comprising:

a vehicle speed sensor that ascertains the speed of the vehicle and provides a signal indicative thereof;

a steering wheel sensor that ascertains the rotational speed of the vehicle steering wheel and provides a signal indicative thereof;

at least one component of the vehicle, other than the electrically assisted power steering system, that consumes electrical power;

at least one component of the vehicle that produces electric power; and a steering voltage controller that receives the signals provided by the vehicle speed sensor and the steering wheel sensor and processes said signals so as to determine when demand is high for power-assisted steering, with said controller controlling the voltage furnished to said at least one electrical power consuming component and said at least one electrical power production component, so as to increase the voltage available to the power steering motor when demand is high for power-assisted steering.

8. A method for increasing the voltage available to an electric power-assisted steering system in an automotive vehicle, comprising the steps of:

sensing the speed of the vehicle;

sensing the rotational speed of the steering wheel;

determining whether the vehicle's speed and the rotational speed of the steering wheel indicate a high demand for power-assisted steering; and, increasing the voltage available to the vehicle's steering system when a high demand for power-assisted steering is indicated.

9. A method according to claim 8, further comprising the step of reducing the electric power consumed by a vehicle component whenever the voltage to the vehicle's steering system is increased.

10. A method according to claim 8, wherein the voltage available to the steering system is increased by increasing the electric power produced by a vehicle component that produces electric power.

11. The method according to claim 8, wherein the voltage available to the steering system is increased by reducing the electrical power consumed by one or more vehicle components that consume electric power and by increasing the voltage produced by one or more vehicle components that produce electric power.

* * * * *